United States Patent
Musku et al.

(10) Patent No.: US 8,547,877 B2
(45) Date of Patent: Oct. 1, 2013

(54) RSTP TRACKING

(75) Inventors: Amarender R. Musku, Sunnyvale, CA (US); Mike Rozhavsky, San Jose, CA (US); Marc Rapoport, Palo Alto, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 665 days.

(21) Appl. No.: 12/750,462

(22) Filed: Mar. 30, 2010

(65) Prior Publication Data

US 2011/0243140 A1 Oct. 6, 2011

(51) Int. Cl.
*H04L 12/28* (2006.01)

(52) U.S. Cl.
USPC .................... 370/256; 370/395.53

(58) Field of Classification Search
USPC ............. 370/256, 389, 395.53, 396, 401; 709/246
See application file for complete search history.

(56) References Cited

U.S. PATENT DOCUMENTS

| | | | |
|---|---|---|---|
| 6,937,576 B1 | 8/2005 | Di Benedetto et al. | |
| 7,209,435 B1 | 4/2007 | Kuo et al. | |
| 7,558,205 B1 * | 7/2009 | Moncada-Elias et al. | 370/236 |
| 7,606,178 B2 * | 10/2009 | Rahman et al. | 370/256 |
| 7,606,939 B1 * | 10/2009 | Finn | 709/246 |
| 8,259,569 B2 * | 9/2012 | Banerjee et al. | 370/230 |
| 2005/0013260 A1 * | 1/2005 | Ramanathan et al. | 370/256 |
| 2006/0198323 A1 * | 9/2006 | Finn | 370/256 |
| 2009/0052336 A1 * | 2/2009 | Nguyen et al. | 370/245 |

OTHER PUBLICATIONS

2009 Brocade Communications Systems Inc.: "Configuring Spanning Tree Protocol (STP) and IronSpan Features," Jun. 1, 2009, XP002645352, 62 pages.

* cited by examiner

*Primary Examiner* — Hassan Kizou
*Assistant Examiner* — Emmanuel Maglo
(74) *Attorney, Agent, or Firm* — Blakely, Sokoloff, Taylor & Zafman

(57) ABSTRACT

On a first network element to support rapid spanning tree protocol (RSTP) for a plurality of virtual local area networks (VLANs) in a network, receiving a packet from a second network element in the network; identifying a VLAN associated with the packet by checking for a tag in the packet; determining whether the VLAN associated with a packet is a master VLAN or a client VLAN, wherein the master VLAN and client VLAN are in a group of VLANs with identical topologies, such that a spanning tree can be maintained for the group of VLANs that are represented by the master VLAN; deriving forwarding information from the master VLAN associated with the client VLAN, in response to determining that the VLAN is a client VLAN; and forwarding the packet according to the forwarding information derived from the master VLAN, whereby separate spanning trees for each group of VLANs serviced by the first network element are efficiently maintained.

20 Claims, 3 Drawing Sheets

RSTP TRACKING

FIELD OF THE INVENTION

Embodiments of the present invention relate to a system for managing the rapid spanning tree protocol over a network. Specifically, the embodiments of the invention relate to a method and system for efficiently maintaining and storing the rapid spanning tree protocol data.

BACKGROUND

The rapid spanning tree protocol is a variant of the spanning tree protocol that is used to ensure loop free data forwarding in a layer 2 (Open Systems Interconnect Reference Mode-OSI) network topology. The rapid spanning tree protocol is used to determine a path for traffic to be forwarded across a network to ensure that the traffic does not loop back to the sending network element. However, the use of the rapid spanning tree protocol is complicated by the presence of virtual local area networks within the topology of the larger network. The virtual local area networks have a distinct topology from the overall network and a rapid spanning tree developed based on the entire network may not be efficient or guarantee the proper transmission of traffic for any particular virtual local area network within the network. The use of a single spanning tree at each node of the network is referred to as mono spanning tree.

A rapid spanning tree can be maintained by a network element at a port level and each port where all virtual local area networks are discarding is blocked. However, this prevents the use of alternate paths for different virtual local area networks, resulting in inefficient use of overall network bandwidth and resources.

One solution to the problem posed by the combination of virtual local area networks and the rapid spanning tree protocol is to create a rapid spanning tree protocol instance for each virtual local area network. However, this solution introduces a problem of scale. On any given network there can be a large number of virtual local area networks operating within its topology. Storing and maintaining a separate spanning tree instance for each virtual local area network can be computationally intensive and also require significant storage space and bandwidth.

SUMMARY

A method performed on a first network element to support rapid spanning tree protocol (RSTP) for a plurality of virtual local area networks (VLANs) in a network, the method comprising the steps of: receiving a packet from a second network element in the network; identifying a VLAN associated with the packet by checking for a tag in the packet; determining whether the VLAN associated with a packet is a master VLAN or a client VLAN, wherein the master VLAN and client VLAN are in a group of VLANs with identical topologies, such that a spanning tree can be maintained for the group of VLANs that are represented by the master VLAN; deriving forwarding information from the master VLAN associated with the client VLAN, in response to determining that the VLAN is a client VLAN; and forwarding the packet according to the forwarding information derived from the master VLAN, whereby separate spanning trees for each group of VLANs serviced by the first network element are efficiently maintained.

A method performed on a first network element to support rapid spanning tree protocol (RSTP) for a plurality of virtual local area networks (VLANs) in a network, the method comprising the steps of: receiving a notice of a change in topology in the network from a second network element; updating the RSTP forwarding information of each master VLAN tracked by the first network element based on the change in topology in the network, wherein a master VLAN and a client VLAN are in a group of VLANs with identical topologies, such that a spanning tree can be maintained for the group of VLANs that are represented by the master VLAN; and providing updated RSTP forwarding information to each client VLAN tracked by the first network element based on a corresponding master VLAN, whereby separate spanning trees for each group of VLANs serviced by the first network element are efficiently maintained.

A first network element adapted to support rapid spanning tree protocol (RSTP) for a plurality of virtual local area networks (VLANs) in a network, the first network element comprising: an RSTP module to manage data traffic forwarding in the network to avoid looping; and an RSTP tracking module adapted to receive a packet from a second network element in the network, adapted to identify a VLAN associated with the packet by checking for a tag associated with the packet, adapted to determine whether the VLAN associated with the packet is a master VLAN or a client VLAN, wherein the master VLAN and client VLAN are in a group of VLANs with identical topologies, such that a spanning tree can be maintained for the group of VLANs that are represented by the master VLAN, the RSTP tracking module adapted to derive forwarding information from the master VLAN associated with the client VLAN, in response to determining that the VLAN is a client VLAN, and adapted to forward the packet according to the forwarding information derived from the master VLAN, whereby separate spanning trees for each group of VLANs serviced by the first network element are efficiently maintained.

A network adapted to support rapid spanning tree protocol (RSTP) for a plurality of virtual local area networks (VLANs) in the network, the network comprising: a first network element adapted to receive and forward traffic for each of a plurality of VLANS; and a second network element adapted to receive a packet from the first network element in the network, adapted to identify a VLAN associated with the packet by checking for a tag in the packet, adapted to determine whether the VLAN associated with the packet is a master VLAN or a client VLAN, wherein the master VLAN and client VLAN are in a group of VLANs with identical topologies, such that a spanning tree can be maintained for the group of VLANs that are represented by the master VLAN, the second network element adapted to derive forwarding information from the master VLAN associated with the client VLAN, in response to determining that the VLAN is a client VLAN, and adapted to forward the packet according to the forwarding information derived from the master VLAN, whereby separate spanning trees for each group of VLANs serviced by the first network element are efficiently maintained.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted

DETAILED DESCRIPTION

Figure 1:
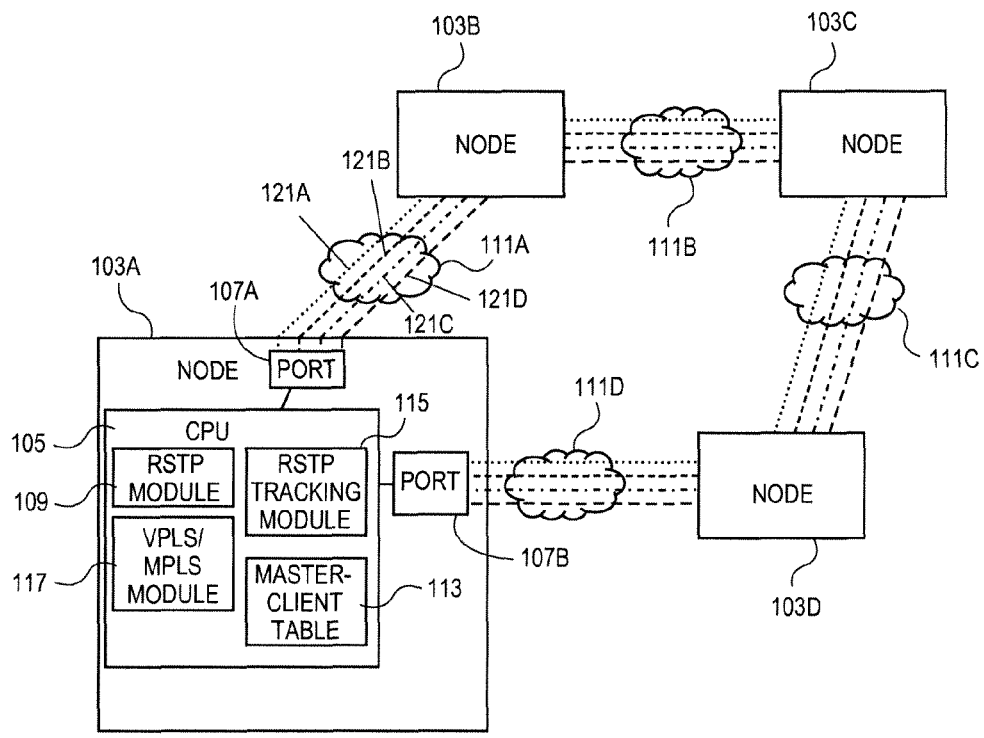
FIG. 1 is a diagram of one embodiment of a network including a network element implementing rapid spanning tree protocol tracking.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiment of FIG. 1. However, it should be understood that the operations of the flow diagrams can be formed by embodiments of the invention other than those discussed with reference to FIG. 1 and the embodiments discussed with reference to FIG. 1 can perform operations different than those discussed with reference to the flow diagrams of FIGS. 2 and 3.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable or computer-readable media, such as machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage device and signals carrying the network traffic respectively represent one or more machine-readable or computer-readable storage media and machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOID) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The embodiments of the present invention provide a system, network and method for avoiding the disadvantages of the prior art including: non-optimal rapid spanning tree protocol use with virtual local area networks, higher bandwidth requirements, and inefficient bandwidth utilization.

The embodiments of the invention overcome these disadvantages by grouping virtual local area networks where a rapid spanning tree instance is efficiently maintained for each group of virtual local area networks. Each group of virtual local networks has a designated master while the remaining virtual local area networks are designated as clients. Each grouping has an identical topology. Maintenance of the master virtual local area network can be used to derive the forwarding topology for the client virtual local area network. This reduces the reduces the process load of having as many rapid spanning tree protocol instances as virtual local area networks, but still enables traffic load balancing by assigning different groups of virtual local area networks to different master virtual local area network and rapid spanning tree protocol instances.

FIG. 1 is a diagram of one embodiment of a network including a node implementing rapid spanning tree protocol tracking. The network can be any type of network including any number of nodes 103A-103D and connections 111A-111D. The connections 111A-111D in the network between the nodes 103A-103D can be any type of communication medium including wired and wireless communication mediums. In one embodiment, the network can be a local area network (LAN), a wide area network (WAN), such as the bridged network or a similar communication network. The nodes 103A-103D can be network elements such as routers, bridges, repeating devices, or computing devices, such as desktop computers, handheld computers, laptop computers, console devices and similar computing devices.

The nodes 103A-103D can be connected through a set of virtual local area networks (VLANs) 121A-121D. These VLANs can have any topology that is a subset of the overall network. The VLANs 121A-121D are illustrated as connecting all the nodes, however, one of ordinary skill in the art would understand that a VLAN can connect any subset of the nodes within the network. A set of VLANs 121A-121D is provided here by way of example. One of ordinary skill in the art would understand that other similar technologies that utilize the rapid spanning tree protocol (RSTP) can also make use of the features and structures described herein. A 'set' or 'subset' as used herein refers to any positive whole number of items including one item.

The node 103A can include any number of ports such as ports 107A, 10713, and a processor 105 that processes the traffic received on each of the ports 107A, 107B.

In one embodiment, the processor 105 is a central processing unit (CPU). The network processing unit can include a set of hardware modules, can execute a set of software modules or any combination thereof including a rapid spanning tree protocol module 109, rapid spanning tree protocol tracking module 115, a virtual private LAN service module or multiprotocol label switching module 117, a master-client table 113 and similar components.

The rapid spanning tree protocol module 109 calculates and maintains a spanning tree for the network including nodes 103A-103D and can be called to calculate a rapid spanning tree for any subset of the network, such as a VLAN. The VPLS module or MPLS module 117 is an optional module supports VPLS and MPLS, respectively. VPLS is a service that provides Ethernet based multipoint to multipoint connectivity. MPLS is a switching mechanism for routing traffic through a network using labels.

The rapid spanning tree tracking module implements the process described herein below and illustrated in FIGS. 2 and 3. The rapid spanning tree protocol tracking module maintains a rapid spanning tree for each of the VLANs that the node 103A is a part of. However, the rapid spanning tree protocol tracking module 115 only maintains a complete rapid spanning tree and associated data for a set of VLANs designated as 'master' VLANs. These master VLANs are associated with a group of client VLANs. Master VLANs and client VLANs are VLANs that have identical topologies and similar characteristics. The master-client relationship is essentially a grouping of similar or identical VLANs. Any of the roughly identical VLANs in these groupings can be designated as a master, while the remainder are designated as clients. By maintaining only the rapid spanning tree for the master VLAN, the overhead including the computational resources and bandwidth to maintain the rapid spanning tree for each VLAN is greatly reduced. The rapid spanning tree tracking module 115 utilizes the master-client table 113 to track the relationships between master and client VLANs. This may be implemented as a lookup table or a similar fast access device or data structure. In one embodiment, a spanning tree is only stored for the master VLAN and client VLANs derive forward information from the spanning tree. In other embodiments, separate spanning trees are stored for master and client VLANs, but messaging to maintain the spanning trees is only performed for the master VLAN and changes to the master VLAN are promulgated or derived for the client VLANs.

Figure 2:
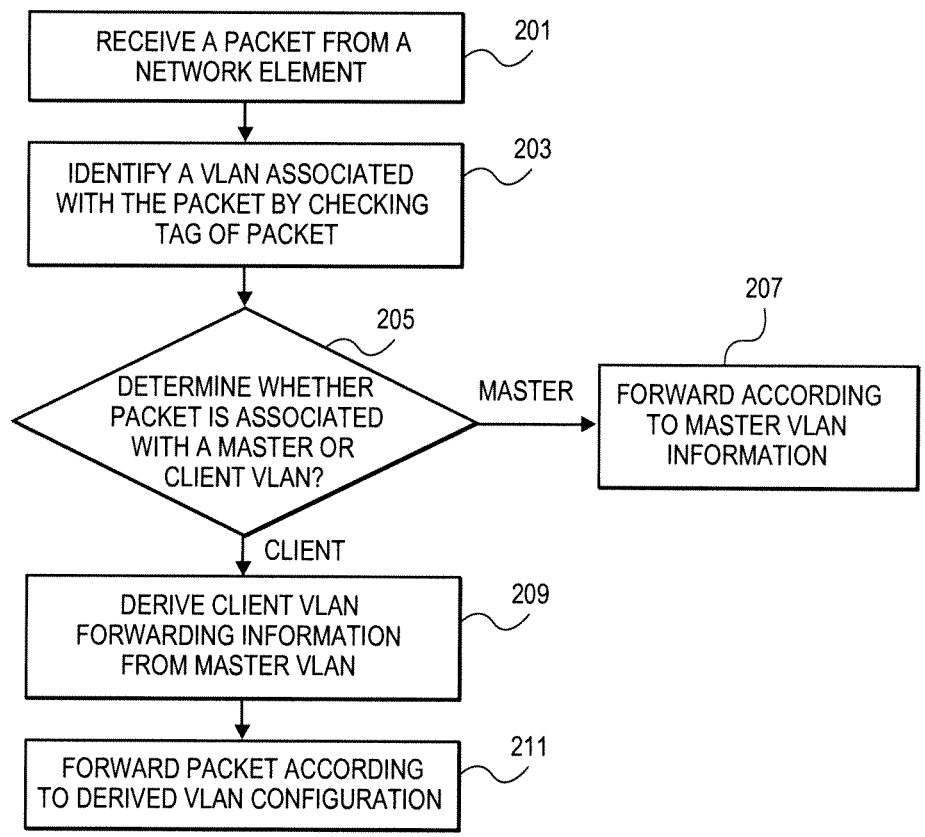
FIG. 2 is a flowchart of one embodiment of a process for forwarding data using rapid spanning tree protocol tracking.

FIG. 2 is a flowchart of one embodiment of a process for managing the forwarding of data traffic in the node implementing RSTP tracking. In one embodiment, the process is initiated by the reception of a packet by the node implementing RSTP tracking from another network element within the network (Block 201). This packet can be received on any port on the node. The packet is examined to determine whether a VLAN is associated with the packet (Block 203). The identification of the associated VLAN is accomplished by identifying whether a tag or similar identifier for the VLAN is within the packet. In the case of a native VLAN, no tag may be present. All VLAN packets that have no tag are assumed to be associated with the native VLAN. All other VLAN traffic must have a specific tag identifying the associated VLAN. Any packet not associated with a VLAN will be forwarded or processed based on its destination, the main RSTP and similar factors.

A check is then made to determine whether the VLAN packet is associated with either a master VLAN or a client VLAN (Block 205). This can be determined by a look-up in the master-client lookup table or similar data structure using the tag or similar identifier of the VLAN or in the case of a native VLAN, a default value or similar value can be utilized. If the VLAN is determined to be a master VLAN based on the response from the lookup, then the VLAN packet can be forwarded or processed according to the forwarding information, RSTP and similar characteristics of the master VLAN (Block 207). The master VLAN forwarding information can designate an outgoing port consistent with a rapid spanning tree maintained for that master VLAN such that the data traffic can be forwarded towards a destination address without looping. If the data packet has reached its destination, then it is processed by the network node, according to the type of the data received.

If the packet is determined to be associated with a client VLAN, then the forwarding information for the client VLAN is derived either directly or indirectly from the master VLAN data. The lookup table can return the identifier for the master VLAN that is associated with the client VLAN. Since the master VLAN has characteristics that are roughly identical to that of the client VLAN, the master VLAN forwarding information and similar related data associated with its rapid spanning tree can be retrieved and utilized to process the packet. This can be done directly in response to receiving a client VLAN packet or client VLAN data can be continuously or asynchronously updated in response to changes in the master VLAN data. The packet is then forwarded according to the derived VLAN information (Block 211).

Figure 3:
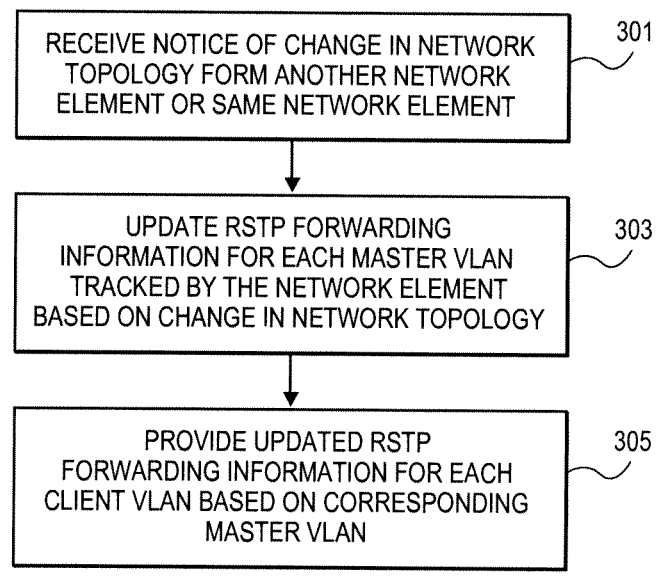
FIG. 3 is a flowchart of one embodiment of a process for updating network topology information using rapid spanning tree protocol tracking.

FIG. 3 is flowchart of one embodiment of a process for updating network topology using RSTP tracking. In one embodiment, the process for updating a topology in the network is initiated in response to receiving a notice of a change in network topology from another network element or the same network element (Block 301). The notice of change can be in the form of a dedicated message for updating the topology of a network as part of the RSTP or through similar signaling or protocol. This change can be received on any port of the network element and used to update the internal representation of the network topology maintained by the network element. Similarly, the same network element can detect a change in or be directed to change the topology of the network. Once the overall network topology has been updated then each master VLAN tracked by the RSTP tracking module of the network element can have its associated rapid spanning tree configuration and associated forwarding information updated in light of the changes to the overall network topology (Block 303).

After each of the master VLANs are updated to conform with the change of the network topology, then each of the corresponding client VLANs may be updated to reflect the changes corresponding to the master VLAN (Block 305). Since each of the client VLANs has a network topology identical to the master VLAN any changes to the master VLAN topology, forwarding information and rapid spanning tree, are applicable to those of the client VLAN's topology, forwarding information and rapid spanning tree. In one embodiment, the rapid spanning tree and forwarding information for each of the client's VLANs is stored and updated separately to facilitate speed of use for processing traffic for the client VLANs, however, the traffic necessary for maintaining and updating the topology and forwarding information of the client VLAN is avoided. In other embodiments, a separate rapid spinning tree and forwarding information is not maintained.

In one embodiment, during a topology change, media access control (MAC) address are flushed to avoid MACs being assigned to the wrong ports of the network element implement RSTP tracking. For example, a bridge master can have ports A, B and C with clients c1, c2 and c3 corresponding to VLANS v1, v2 and v3. If a notice of topology change is received on port A, then a flush of port B and port C MACs is performed. When port B and port C MACS are flushed, then VLAN v2 and v3 MACs are flushed on these ports since they are client VLANs.

Figure 4:
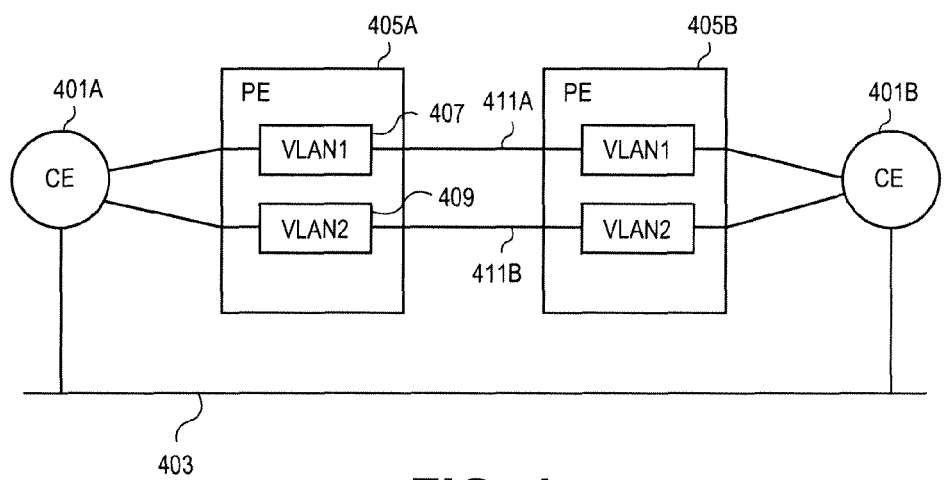
FIG. 4 is a diagram of one embodiment of the rapid spanning tree protocol tracking being utilized in a virtual private local area network system.

FIG. 4 is a diagram of one embodiment of an application of RSTP tracking to virtual private line service pseudo wires. In this example embodiment, the rapid spanning tree is maintained at the provider equipment 405A, 405B for each of the VLANs 407, 409 maintained by the respective provider equipment 405A, 405B. Pseudo wires 411A, 411B are used to connect the provider equipment 405A, 405B for each of the respective VLANs supported.

In this example embodiment, the VLAN1 407 and VLAN2 409 are established such that VLAN1 407 can be a master and VLAN2 409 is a client VLAN. This configuration enables some of the overhead required to maintain each of these VLANs 407, 409 to be avoided. This embodiment represents a dual homed redundant customer equipment topology. RSTP priorities can be set such that the backdoor 403 will be either the primary connection or an alternate connection.

RSTP tracking can be applied to other cases such as in combination with the emulation of multiple spanning trees. In this way mono spanning tree topologies can be converted to multiple spanning tree emulation. In one example, RSTP tracking masters can be established for VLANs with an odd tag and even tag. All odd client VLANs can be derived from an odd master and all even client VLANs can derive from even master. Since there are two separate RSTP instances, the RSTP instances can be configured such that each has a path that goes across a different segment of the network so that the resources can be more efficiently utilized than in the case where a single rapid spinning tree is utilized. For example, referring to FIG. 1, a multiple spanning tree implemented across this sample network where VLAN 121A is designated as a master, the link between node 103A and node 103B may be blocked, whereas for VLAN 121B the link between node 103A and 103D can be utilized. Thus, even though both VLANs can have endpoints 103A and 103C, both connecting segments can be utilized to deliver the traffic. There are no limits on how many master VLANs and client VLANs can be allowed or the way that the master and clients are selected or grouped.

Thus, a method, system and apparatus for RSTP tracking has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method performed on a first network element to support rapid spanning tree protocol (RSTP) for a plurality of virtual local area networks (VLANs) in a network, the method comprising the steps of:
   receiving a packet from a second network element in the network;
   identifying a VLAN associated with the packet by checking for a tag in the packet;
   determining whether the VLAN associated with a packet is a master VLAN or a client VLAN, wherein the master VLAN and client VLAN are in a group of VLANs with identical topologies, such that a spanning tree can be maintained for the group of VLANs that are represented by the master VLAN;
   deriving forwarding information from the master VLAN associated with the client VLAN, in response to determining that the VLAN is a client VLAN; and
   forwarding the packet according to the forwarding information derived from the master VLAN,
   whereby separate spanning trees for each group of VLANs serviced by the first network element are efficiently maintained.

2. The method of claim 1, wherein identifying the VLAN further comprises the steps of:
   identifying the VLAN as a native VLAN in response to detecting no tag in the packet; and
   identifying the VLAN by the tag value, in response to detecting the tag in the packet.

3. The method of claim 1, wherein determining whether the VLAN is a master VLAN or a client VLAN further comprises the steps of:
   performing a look-up of a VLAN tag value or native VLAN in a master-client table; and
   receiving an identifier for the master VLAN associated with the client VLAN in response to the look-up.

4. A method performed on a first network element to support rapid spanning tree protocol (RSTP) for a plurality of virtual local area networks (VLANs) in a network, the method comprising the steps of:
   receiving a notice of a change in topology in the network from a second network element;
   updating the RSTP forwarding information of each master VLAN tracked by the first network element based on the change in topology in the network, wherein a master VLAN and a client VLAN are in a group of VLANs with identical topologies, such that a spanning tree can be maintained for the group of VLANs that are represented by the master VLAN; and
   providing updated RSTP forwarding information to each client VLAN tracked by the first network element based on a corresponding master VLAN,
   whereby separate spanning trees for each group of VLANs serviced by the first network element are efficiently maintained.

5. The method of claim 4, further comprising the steps of:
   supporting emulation of multiple spanning tree protocol or VLANs for virtual private local area network service with master VLAN and client VLAN relationships.

6. The method of claim 4, further comprising the steps of:
   storing forwarding information for a plurality of master VLANs with distinct topologies and each master VLAN in the plurality of master VLANs is associated with a plurality of client VLANs having identical topologies, wherein forwarding information for the plurality of client VLANS is not discretely stored.

7. A first network element adapted to support rapid spanning tree protocol (RSTP) for a plurality of virtual local area networks (VLANs) in a network, the first network element comprising:
   an RSTP module to manage data traffic forwarding in the network to avoid looping; and
   an RSTP tracking module adapted to receive a packet from a second network element in the network, adapted to identify a VLAN associated with the packet by checking for a tag associated with the packet, adapted to determine whether the VLAN associated with the packet is a master VLAN or a client VLAN, wherein the master VLAN and client VLAN are in a group of VLANs with identical topologies, such that a spanning tree can be maintained for the group of VLANs that are represented by the master VLAN, the RSTP tracking module adapted to derive forwarding information from the master VLAN associated with the client VLAN, in response to determining that the VLAN is a client VLAN, and adapted to forward the packet according to the forwarding information derived from the master VLAN, whereby separate spanning trees for each group of VLANs serviced by the first network element are efficiently maintained.

8. The first network element of claim 7, wherein the RSTP tracking module is further adapted to identify the VLAN as a native VLAN in response to detecting no tag in the packet, and adapted to identify the VLAN by the tag value, in response to detecting the tag in the packet.

9. The first network element of claim 7, wherein the RSTP tracking module is further adapted to perform a look-up of a VLAN tag value or native VLAN in a master-client table, and adapted to receive an identifier for the master VLAN associated with the client VLAN in response to the look-up.

10. The network element of claim 7, wherein the RSTP tracking module is further adapted to receive a notice of a change in topology in the network from a second network element, adapted to update the RSTP configuration of each master VLAN tracked by the first network element based on the change in topology in the network, and adapted to provide updated RSTP configuration to each client VLAN tracked by the first network element based on a corresponding master VLAN.

11. The network element of claim 10, wherein the RSTP tracking module is further adapted to support emulation of multiple spanning tree protocol (MSTP) with master VLAN and client VLAN relationships.

12. The network element of claim 10, wherein the RSTP tracking module is further adapted to support VLANs for virtual private local area network service (VPLS) with master VLAN and client VLAN relationships.

13. The network element of claim 10, wherein the RSTP tracking module is further adapted to store forwarding information for a plurality of master VLANs with distinct topologies and each master VLAN in the plurality of master VLANs is associated with a plurality of client VLANs having identical topologies, wherein forwarding information for the plurality of client VLANS is not discretely stored.

14. A network adapted to support rapid spanning tree protocol (RSTP) for a plurality of virtual local area networks (VLANs) in the network, the network comprising:

a first network element adapted to receive and forward traffic for each of a plurality of VLANS; and a second network element adapted to receive a packet from the first network element in the network, adapted to identify a VLAN associated with the packet by checking for a tag in the packet, adapted to determine whether the VLAN associated with the packet is a master VLAN or a client VLAN, wherein the master VLAN and client VLAN are in a group of VLANs with identical topologies, such that a spanning tree can be maintained for the group of VLANs that are represented by the master VLAN, the second network element adapted to derive forwarding information from the master VLAN associated with the client VLAN, in response to determining that the VLAN is a client VLAN, and adapted to forward the packet according to the forwarding information derived from the master VLAN, whereby separate spanning trees for each group of VLANs serviced by the first network element are efficiently maintained.

15. The network of claim 14, wherein the second network element is further adapted to identify the VLAN as a native VLAN in response to detecting no tag in the packet, and to identify the VLAN by the tag value, in response to detecting the tag in the packet.

16. The network of claim 14, wherein the second network element is further adapted to perform a look-up of a VLAN tag value or native VLAN in a master-client table, and adapted to receive an identifier for the master VLAN associated with the client VLAN in response to the look-up.

17. The network claim 14, wherein the second network element is further adapted to receive a notice of a change in topology in the network from a second network element, adapted to update the RSTP configuration of each master VLAN tracked by the first network element based on the change in topology in the network, and adapted to provide updated RSTP configuration to each client VLAN tracked by the first network element based on a corresponding master VLAN.

18. The network of claim 17, wherein the second network element is further adapted to support emulation of multiple spanning tree protocol (MSTP) with master VLAN and client VLAN relationships.

19. The network of claim 17, wherein the second network element is further adapted to support VLANs for virtual private local area network service (VPLS) with master VLAN and client VLAN relationships.

20. The network of claim 17, wherein the second network element is further adapted to store forwarding information for a plurality of master VLANs with distinct topologies and each master VLAN in the plurality of master VLANs is associated with a plurality of client VLANs having identical topologies, wherein forwarding information for the plurality of client VLANS is not discretely stored.

* * * * *

UNITED STATES PATENT AND TRADEMARK OFFICE
CERTIFICATE OF CORRECTION

| | | |
|---|---|---|
| PATENT NO. | : 8,547,877 B2 | Page 1 of 1 |
| APPLICATION NO. | : 12/750462 | |
| DATED | : October 1, 2013 | |
| INVENTOR(S) | : Musku et al. | |

It is certified that error appears in the above-identified patent and that said Letters Patent is hereby corrected as shown below:

In the Specification

In Column 2, Line 40, delete "VLANS;" and insert -- VLANs; --, therefor.

In Column 4, Line 8, delete "(VOID)" and insert -- (VoIP) --, therefor.

In Column 5, Line 7, delete "10713," and insert -- 107B, --, therefor.

In Column 7, Line 10, delete "VLANS" and insert -- VLANs --, therefor.

In the Claims

In Column 8, Line 59, in Claim 6, delete "VLANS" and insert -- VLANs --, therefor.

In Column 9, Line 50, in Claim 13, delete "VLANS" and insert -- VLANs --, therefor.

In Column 9, Line 55, in Claim 14, delete "VLANS;" and insert -- VLANs; --, therefor.

In Column 10, Line 54, in Claim 20, delete "VLANS" and insert -- VLANs --, therefor.

Signed and Sealed this
Fifteenth Day of July, 2014

Michelle K. Lee
*Deputy Director of the United States Patent and Trademark Office*